Dec. 8, 1953 J. O. P. HUGHES ET AL 2,661,593
MOUNTING OF GAS TURBINE UNITS
Filed Sept. 2, 1949 4 Sheets-Sheet 1
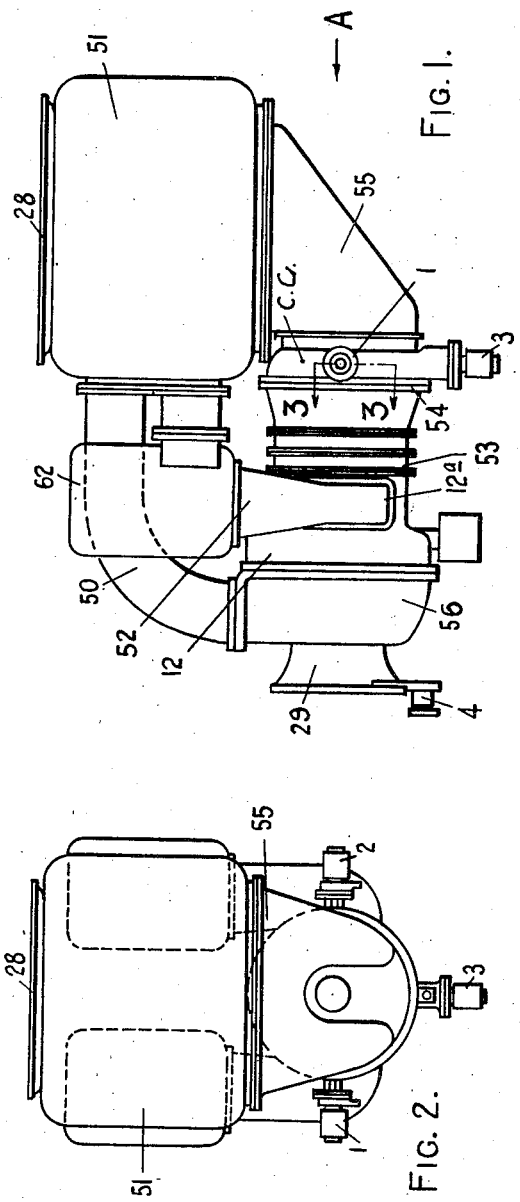
Inventors:
John O. P. Hughes
Paul H. W. Wolff
By Babcock & Babcock
Attorneys Dec. 8, 1953  J. O. P. HUGHES ET AL  2,661,593
MOUNTING OF GAS TURBINE UNITS
Filed Sept. 2, 1949  4 Sheets-Sheet 2

Inventors:
John O. P. Hughes
Paul H. W. Wolff
By Babcock & Babcock
Attorneys

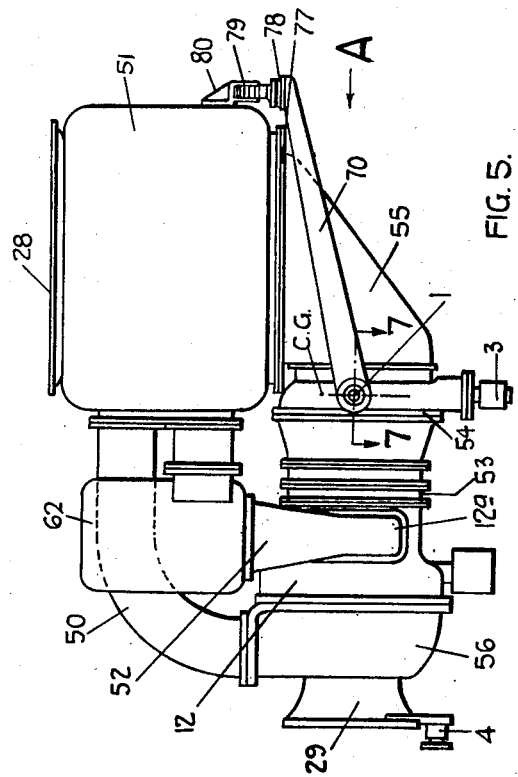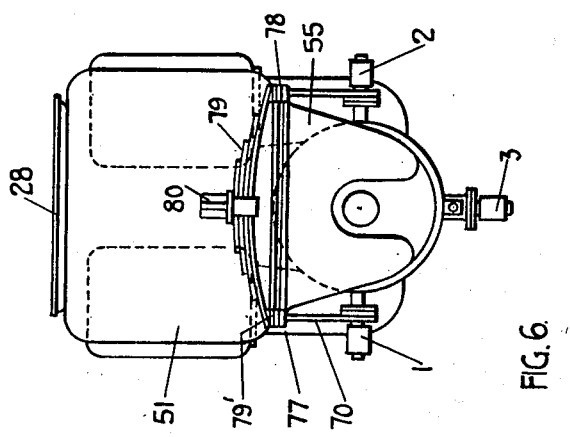

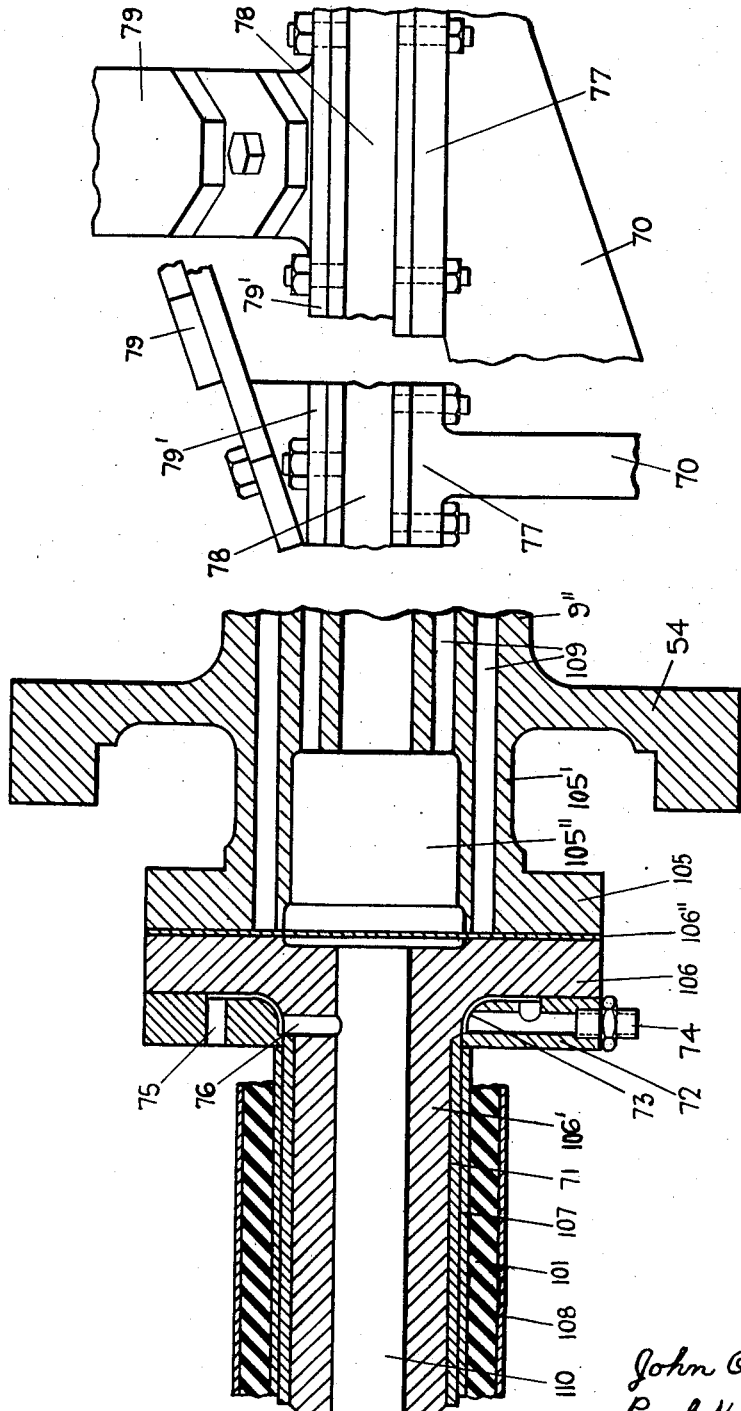

Patented Dec. 8, 1953

2,661,593

UNITED STATES PATENT OFFICE 2,661,593

MOUNTING OF GAS TURBINE UNITS

John Oliver Philip Hughes and Paul Heinz Walter Wolff, Rugby, England, assignors to The English Electric Company Limited, London, England, a British company Application September 2, 1949, Serial No. 113,883
Claims priority, application Great Britain
September 8, 1948

6 Claims. (Cl. 60—39.31)

The invention relates to the mounting of gas turbine units in general, and in gas turbine driven locomotives in particular.

According to the invention a rigid unit, consisting of at least one turbine and compressor therefor, is attached by means of metal bonded rubber bushings arranged substantially in one plane at or near the centre of gravity of the said unit, transverse to the axis thereof, preferably, but not necessarily, with an auxiliary metal bonded rubber bushing or bushings arranged in a direction parallel to the axis of the unit at or near one end of the unit.

As metal bonded rubber bushings offer a comparatively high resistance to deflection in a direction perpendicular to their axis (which is taken by the rubber in compression and tension, respectively) than in the direction of their axis (which is taken by the rubber in shear), such an arrangement provides a good location of the set in alignment with its output shaft while allowing for the thermal expansion of the set in operation.

As the metal bonded rubber bushings preserve their desirable resilient and damping characteristics only up to a certain maximum temperature, say 70° C., the metal bonded rubber bushings or at least some of them, are cooled according to a preferred subsidiary feature of the invention.

According to a development of the invention, a gas turbine unit comprising a heat exchanger the hot pass of which is passed by the exhaust gases of the turbine, and the cold pass of which is passed by the compressed air on its way from the compressor to the combustion chamber, is suspended as a whole in the manner hereinabove described, the heat exchanger being attached to the said unit at its front by means of the compressed air pipes from the compressor and to the combustion chambers, and at its rear to the horizontal radial engine bearers of the said unit by means of cantilever booms rigidly connected to these attachments and extending towards the rear end of the heat exchanger which rests on them by means of a spring having a flat load-deflection characteristic, and preferably also of metal bonded rubber cushions, the suspension allowing a horizontal movement of the said heat exchanger with respect to the said booms at their points of connection.

In order that the invention may be better understood and readily carried into effect, some embodiments thereof will now be described by way of example with reference to the accompanying drawings, in which:

Fig. 1 is a side elevation of a gas turbine unit.

Fig. 2 is an end elevation thereof as seen in the direction of the arrow A of Fig. 1.

Fig. 5 is a side elevation of a gas turbine unit.

Fig. 6 is an end elevation thereof as seen in the direction of the arrow A of Fig. 5.

Fig. 7 is a horizontal cross section on the line 7—7 of Fig. 5 through one of the horizontal radial engine bearers of the gas turbine unit on a larger scale.

Fig. 8 is a side elevation, and

Fig. 9 is an end elevation of a detail of Figs. 5 and 6 seen in the same directions as on these figures but on a larger scale.

Figure 3:
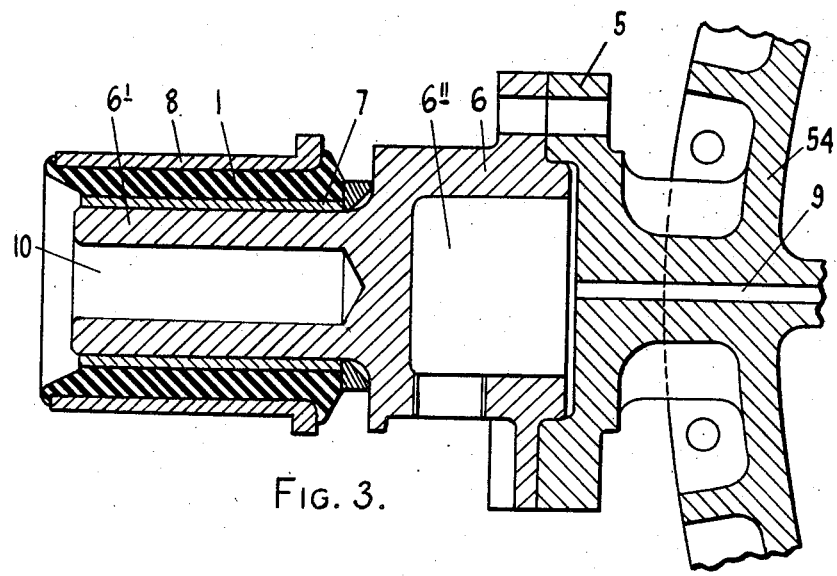
Fig. 3 is a cross section on the line 3—3 of Fig. 1 through one of the horizontal radial engine bearers of the gas turbine unit on a larger scale.

Referring first to Figs. 1–4, the gas turbine of this embodiment (Figs. 1 and 2) is of the kind forming the subject of patent application Ser. No. 76,335 filed on February 14, 1949, now abandoned, comprising a multi-stage compressor arranged in a casing 56, 12 coupled with a gas turbine driving it and arranged in a casing 53, with an independent power output turbine arranged in alignment therewith in the casing 54. 29 is the air intake into the compressor at the front end of the set, 50 the compressed air duct from the compressor output to the top of the heat exchanger 51, 62 are the two symmetrically arranged combustion chambers connected with the bottom of the heat exchanger 51 and, by the elbows 52, with the entrance 12a of the gas turbine casing 53, 55 is the turbine exhaust elbow connected with the bottom of the heat exchanger, and 28 is the discharge funnel therefrom.

This gas turbine unit is supported in the metal bonded rubber bushings 1, 2 and 3 radially arranged with respect to the axis of the unit in a vertical plane substantially through the centre of gravity C. G. of the unit.

By the reasons given above, these bushings offer comparatively little resistance to radial thermal expansions of the turbine casing while they effectively restrain this casing from turning about its axis, moving fore or aft (these two movements being resisted by all three bushings 1, 2 and 3), up or down or yawing about a vertical axis (restricted by the bushings 1 and 2), and right or left or pitching about a transverse axis (resisted by the bushing 3).

Preferably there is an additional metal bonded rubber bushing 4 arranged parallel to the axis of the unit, at the air intake casing 29 which by the same reason does not resist materially any longitudinal thermal expansion of the unit but, due to its long leverage from the centre of gravity, essentially adds to restraining any yawing or pitching movement, and to a small extent also rotation about the axis of the unit.

The combined compressor and turbine casing 29—54 forms the rigid basis of the unit to which the combustion chambers 62 and the heat exchanger 51 are attached, while the exhaust elbow 55 of light construction is not intended as a structural load carrying element.

Referring now to Fig. 3, 54 is part of the main power turbine casing, which carries a flange 5 to which the engine bearer 6 is flanged. The metal bonded rubber bushing 1 is fitted with its inner shell 7 to the reduced portion 6' of the engine bearer 6, while the outer shell 8 is provided for being fitted into the socket of part of the outer supporting structure, say the framework of a locomotive.

A chamber 6" is provided in the flanged portion of the engine bearer 6 which is adapted to be connected with the coolant, preferably cool air under pressure. A number of bores 9 (of which one only is shown) are arranged in the casting of the turbine casing 54 in order to deliver this air, after it has performed its task as a coolant, into the main gas stream of the turbine. A bore 10 is arranged in the reduced portion 6' of the engine bearer in order to reduce the cross section available to the flow of heat from the turbine casing towards the rubber bushing 1. This bore 10 is preferably opening outwards to allow the access of cool air from the atmosphere.

Figure 4:
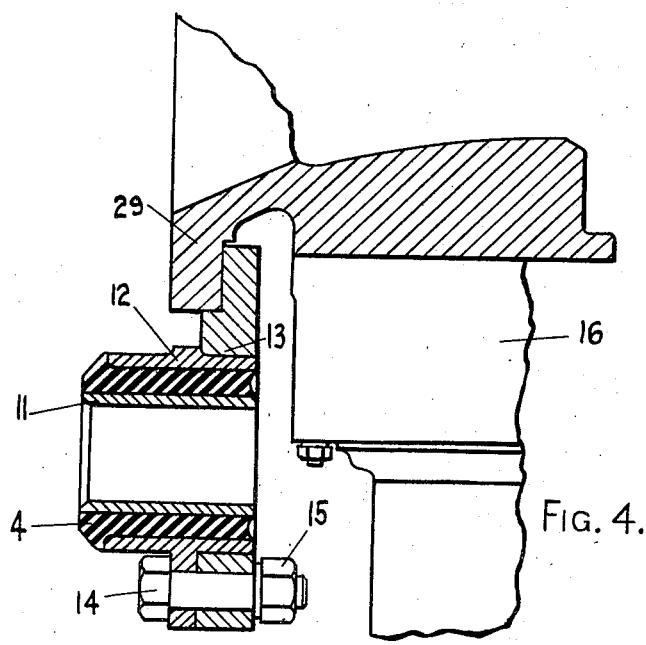
Fig. 4 is a longitudinal section through the subsidiary engine mounting at the front end of the gas turbine set, on the same scale as Fig. 3.

Referring now to Fig. 4, the auxiliary rubber bushing 4 is bonded to an inner shell 11 adapted to be fitted on a spigot of the outer supporting structure and a flanged outer shell 12 attached by means of bolts 14 and nuts 15 to a flange 13, in turn fixed to the compressor air intake 29. Auxiliaries to the compressor are schematically indicated at 16.

Referring now to the modified general arrangement shown in Figs. 5 and 6, the development of this arrangement consists mainly in that a cantilever boom 70 is attached with its flanges 72 (see also Fig. 7) to the flange 6 of each engine bearer on both sides of the gas turbine unit.

The free ends of these booms 70 carry brackets 77 on each of which a metal bonded rubber pad 78 is attached with its lower metal plate (see also Figs. 8 and 9); the upper metal plate of each rubber pad 78 is attached to a plate 79' at the end of an inverted semi-elliptic spring 79 the centre of which is attached to a bracket 80 at the rear of the heat exchanger 51.

The weight of the heat exchanger 51 is thus carried partly by the connecting pipes to the combustion chambers 62 and the pipe 50 from the compressor 56 and partly by the spring and cantilever boom arrangement described hereinabove. Thus the weight of the heat exchanger 51 is eventually transmitted to the engine bearers and resilient bushings 1 and 2 supported by the base of the power plant, such as the main frame of a locomotive.

Differential thermal expansion in the vertical direction is taken by the deflection of the semi-elliptic spring which is preferably given a flat load characteristic, i. e. wherein the load does not vary substantially with the deflection. Differential thermal expansions in the horizontal plane are taken by the rubber pads 78 in shear. The spring 79 and rubber pads 78 provide at the same time a resilient suspension of the rear end of the heat exchanger 51 which is subjected to jolts in a mobile plant such as a locomotive.

Referring now particularly to Fig. 7, 54 is that part of the power turbine casing wherein the main bearing of the power turbine rotor is housed. This bearing (not shown) is connected to the casing 54 by radial spokes 109' of aerofoil cross section the outer part only of a horizontal spoke being shown.

The casing 54 has sockets 105' integral with it enclosing a cavity 105" and carrying a flange 105 to which the engine bearer 106 is flanged. A shim 106" of metal, or preferably of heat insulating material is interposed between the flanges 105 and 106. The reduced portion 106' of the engine bearer has a central bore 110 in order to restrict the cross section available to the flow of heat from the turbine casing towards the rubber bushing 101 which is fitted to the portion 106' with its inner shell 107, preferably with a heat insulating bush 71 of asbestos or the like interposed. The outer shell 108 of the rubber bushing 101 is arranged for being fitted into the socket of part of the outer supporting structure, say the framework of a locomotive.

The flange 72 of the cantilever boom 70 is bolted to the flanges 105 and 106, with a toroid recess 73 left between the inner parts of the flanges 72 and 106.

Cooling air is blown from outside through a socket 74 into this recess 73 from where it can escape through the openings 75 and in the flange 72 or through the bores 76 and 110 of the reduced portion 106' of the engine bearer.

Separate cooling air for the turbine main bearing may be blown through the ducts 109 in the spokes 109' of the part 54 of the casing whereby the influx of heat into the socket 105' carrying the flange 105 is reduced.

If desired, the bore 110 may be closed outside and the shim 106" may be perforated, so that the same air stream, after having cooled the engine bearer is passed through the bores 109 as part of the cooling medium for the turbine main bearing.

What we claim as our invention and desire to secure by Letters Patent is:

1. For a gas turbine plant including at least one turbine, the compressor and at least one combustion chamber therefor all forming a rigid unit, and a heat exchanger, a mounting comprising in combination: a pair of metal bonded rubber bushings arranged opposite one another on a horizontal diameter of the said unit, another metal bonded rubber bushing arranged on a radius perpendicular to said diameter substantially in the same vertical plane adjacent the centre of gravity of the said unit, compressed air tubes rigidly connecting the front end of the said heat exchanger with the said combustion chamber and compressor, a pair of cantilever booms attached to the said rigid unit adjacent the said diametrically arranged bushings, and spring means supporting the said heat exchanger on the free ends of the said cantilever booms.

2. A mounting as claimed in claim 1 comprising in addition a pair of metal bonded rubber pads supporting said spring means on the free ends of the said cantilever booms, and wherein the said spring means is an inverted semi-elliptical leaf spring having a flat load characteristic, attached with its middle to the middle of the rear end of the said heat exchanger transversely to the axis of the said unit, and resting with its free ends on the said metal bonded rubber pads, the said spring allowing for differential thermal expansion of the said heat exchanger and the said rigid unit in a vertical direction, and the said metal bonded rubber pads allowing for differential thermal expansion of the said heat exchanger and the said rigid unit in the horizontal plane.

3. For a gas turbine plant including at least one turbine and the compressor therefor forming a rigid unit, a mounting comprising in combination: brackets attached to the said rigid unit substantially in the same plane perpendicular to the axis and adjacent to the centre of gravity thereof, engine bearers having a heat conductive path of a reduced cross section area of metal available from the said brackets through the said engine bearers, cooling means cooling the said engine bearers, and metal bonded rubber bushings attached to the said engine bearers and supporting the said rigid unit in the said plant, the said reduced heat conductive cross section area and the said cooling means providing a minimum of conduction of heat to the said rubber bushings.

4. A mounting as claimed in claim 3, comprising in addition a layer of heat insulating material arranged between the said brackets and the said engine bearers.

5. A mounting as claimed in claim 3, comprising in addition a layer of heat insulating material arranged between the said engine bearers and the said metal bonded rubber bushings.

6. A mounting as claimed in claim 3, comprising as the said cooling means, passages through the said engine bearers arranged for serving as conduits for a flow of a coolant.

JOHN OLIVER PHILIP HUGHES.
PAUL HEINZ WALTER WOLFF.

References Cited in the file of this patent

UNITED STATES PATENTS

| Number | Name | Date |
|---|---|---|
| 1,778,503 | Lord | Oct. 14, 1930 |
| 1,862,484 | Lord et al. | June 7, 1932 |
| 2,193,332 | Hasbrouck | Mar. 12, 1940 |
| 2,369,795 | Planiol et al. | Feb. 20, 1945 |
| 2,403,388 | Morey et al. | July 2, 1946 |
| 2,443,054 | Putz et al. | June 8, 1948 |
| 2,481,547 | Walker et al. | Sept. 13, 1949 |
| 2,529,955 | Morley | Nov. 14, 1950 |

OTHER REFERENCES

Ser. No. 288,972, Julien et al. (A. P. C.), published May 25, 1943.